J. R. SUNGAIL.
AUTOMATIC REGISTERING MECHANISM.
APPLICATION FILED JAN. 28, 1915.

1,202,241.

Patented Oct. 24, 1916.
11 SHEETS—SHEET 4.

J. R. SUNGAIL.
AUTOMATIC REGISTERING MECHANISM.
APPLICATION FILED JAN. 28, 1915.

1,202,241.

Patented Oct. 24, 1916.
11 SHEETS—SHEET 7.

Witnesses
Guy M. Spring
C. W. P. Newbold

John R. Sungail Inventor
By Richard B. Owen
Attorney

J. R. SUNGAIL.
AUTOMATIC REGISTERING MECHANISM.
APPLICATION FILED JAN. 28, 1915.

1,202,241.

Patented Oct. 24, 1916.
11 SHEETS—SHEET 8.

J. R. SUNGAIL.
AUTOMATIC REGISTERING MECHANISM.
APPLICATION FILED JAN. 28, 1915.

1,202,241.

Patented Oct. 24, 1916.
11 SHEETS—SHEET 9.

Inventor
John R. Sungail.

Witnesses
Guy M. Spring.

By Richard B. Owen.
Attorney

J. R. SUNGAIL.
AUTOMATIC REGISTERING MECHANISM.
APPLICATION FILED JAN. 28, 1915.

1,202,241.

Patented Oct. 24, 1916.

UNITED STATES PATENT OFFICE.

JOHN R. SUNGAIL, OF CICERO, ILLINOIS.

AUTOMATIC REGISTERING MECHANISM.

1,202,241.        Specification of Letters Patent.     Patented Oct. 24, 1916.

Application filed January 28, 1915. Serial No. 4,898.

*To all whom it may concern:*

Be it known that I, JOHN R. SUNGAIL, a subject of the Czar of Russia, residing at Cicero, in the county of Cook and State of Illinois, have invented certain new and useful Improvements in Automatic Registering Mechanism, of which the following is a specification.

This invention relates to means connectible to a certain class of registering devices for the operation thereof and more particularly relates to means for counting the number of persons entering or leaving a street car or other public vehicle.

As a principal object, this invention contemplates the provision of a device of this character which shall include a cased mechanism capable of properly actuating a registering device when the former is first operated by the depression of steps giving access to the vehicle as each person enters or leaves the vehicle.

More specifically, a further object is to provide a cased mechanism of the type set forth which shall necessitate successive actuation impulses caused by the depression of two or more steps before causing the registration in the counting device of the entrance or departure of a person.

A still further object is to provide with this cased mechanism, means to be contained therein which while requiring the successive depression of steps will be capable of properly absorbing the impulses of actuation given thereby regardless of which impulse is first received, and which will correctly register the entrance into or departure from the vehicle of the person accordingly.

An object of equal importance is to provide connecting means to be interposed between the steps to be depressed and the cased mechanism described which shall permit of the positioning of said mechanism at such a point as will not interfere with the progress of a passenger into or from a car.

It is also an aim of this invention to provide for conjunctive use with a cased mechanism capable of accomplishing the foregoing objects, pairs of hinged steps normally maintained in a slightly raised position by their connections with said plunger, yet resiliently so, so as to permit of their depression into a horizontal plane when actuating the mentioned mechanism.

It is a further coördinate object to construct a counting mechanism of the character set forth by such a reduction to simple elements as to produce a device of inconspicuous size which shall be capable of being cheaply manufactured as well as being durable and efficient in operation.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts.

Figures 1, 2, 3:
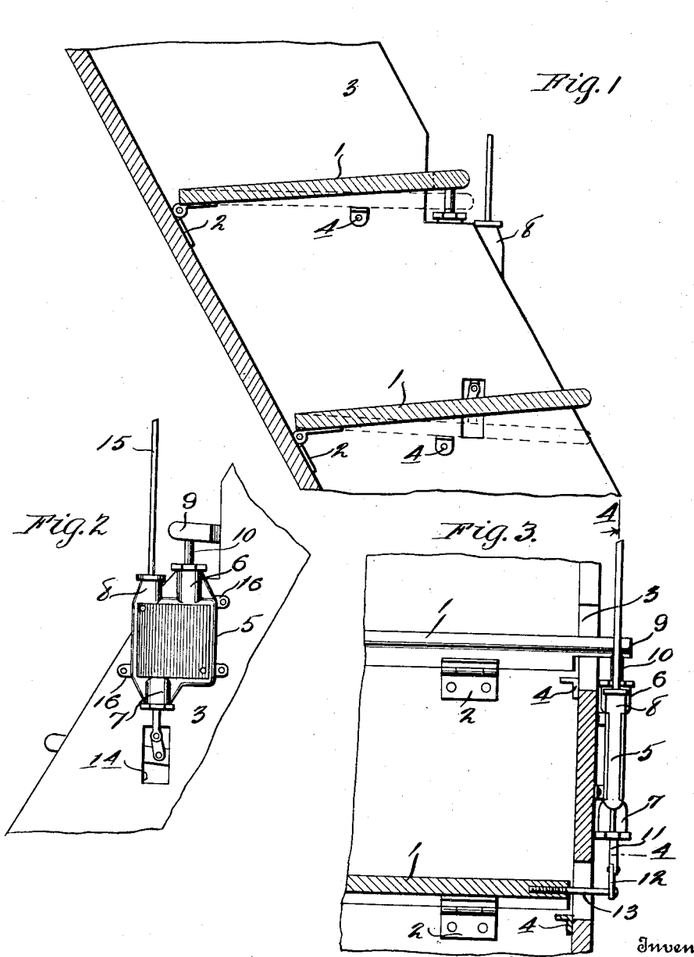
Figure 1 is a sectional view taken through the steps giving access to a vehicle and egress therefrom, showing the application thereto of a form of this invention.
Fig. 2 is an elevational view of the steps from the opposite side showing the positioning of the casing to one side of the steps.
Fig. 3 is a front view of the steps, parts being shown in section, showing the method of connection to the casing.

In equipping street cars and other public vehicles with a device of the character illustrated more particularly in Figs. 1 to 11 inclusive, the steps 1 of a car are hingedly supported along their rear edges as indicated at 2 and the side walls 3 therefor carry angular stops 4 whereby the steps may be supported and their downward movement limited in the horizontal position indicated by the dotted lines of Fig. 1. The casing adapted to contain the mechanism to be hereinafter particularly described is designated as a whole by the numeral 5 and includes an essentially squared body portion formed with an interior chamber with which communicate apertured cylindrical portions 6, 7 and 8 respectively. The upper step 1 has one of its forward corners extended laterally as at 9 in order to project beyond the adjacent side wall 3 which at this point is cut away to permit such projection. A reciprocable stem 10 is slidable in the upper cylinder 6 and is connected to the projecting step portion 9 while a similar stem 11 has link connections 12 with a bolt 13 adapted to be threaded into the side edge of the lower step 1 through a suitable slot 14 formed in the side wall 3 at this point, such stem 11 being also reciprocatable and within the cylinder 7. The stem 15 forms a true connection with a meter or other registering device not shown upon the drawings, but which may be of any desired construction adapted to fulfil the preceding objects as will be later explained. The stem 15 is slidable within the cylindrical portion 8 and lugs 16 or lateral ears are formed upon the casing 5 so that the latter may be readily secured to the outer side of the step wall 3, it being here noted that one such casing must be provided for each flight of steps permitting entrance into or egress from the vehicle and that all of the rods 15 are to be preferably connected to the single meter.

Figure 4:
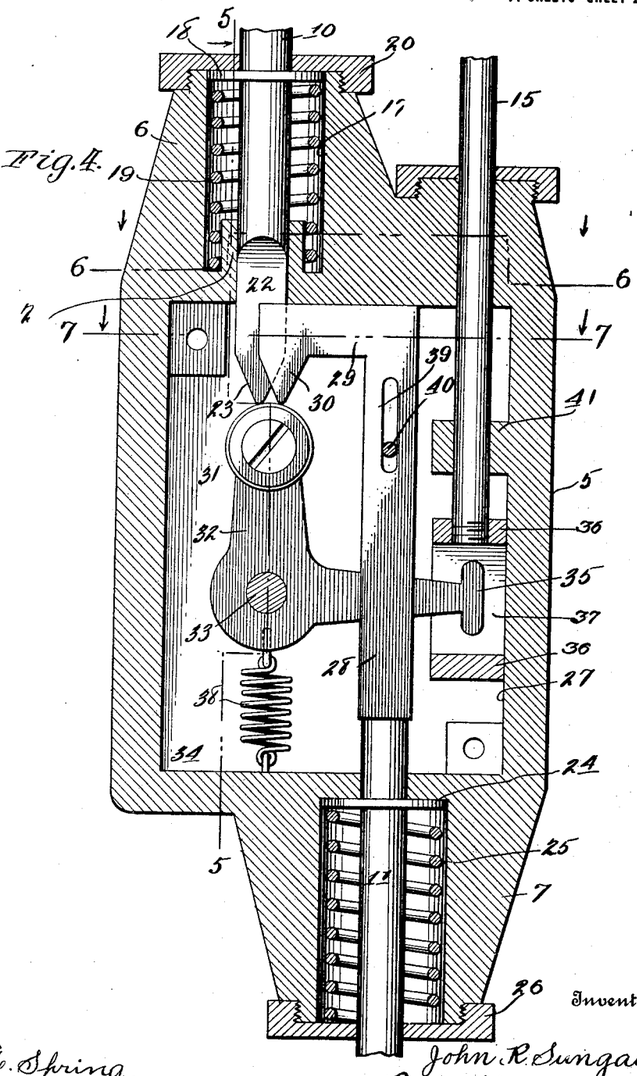
Fig. 4 is an enlarged vertical section taken through the casing showing the inner mechanism thereof.
Figures 5, 6, 7:
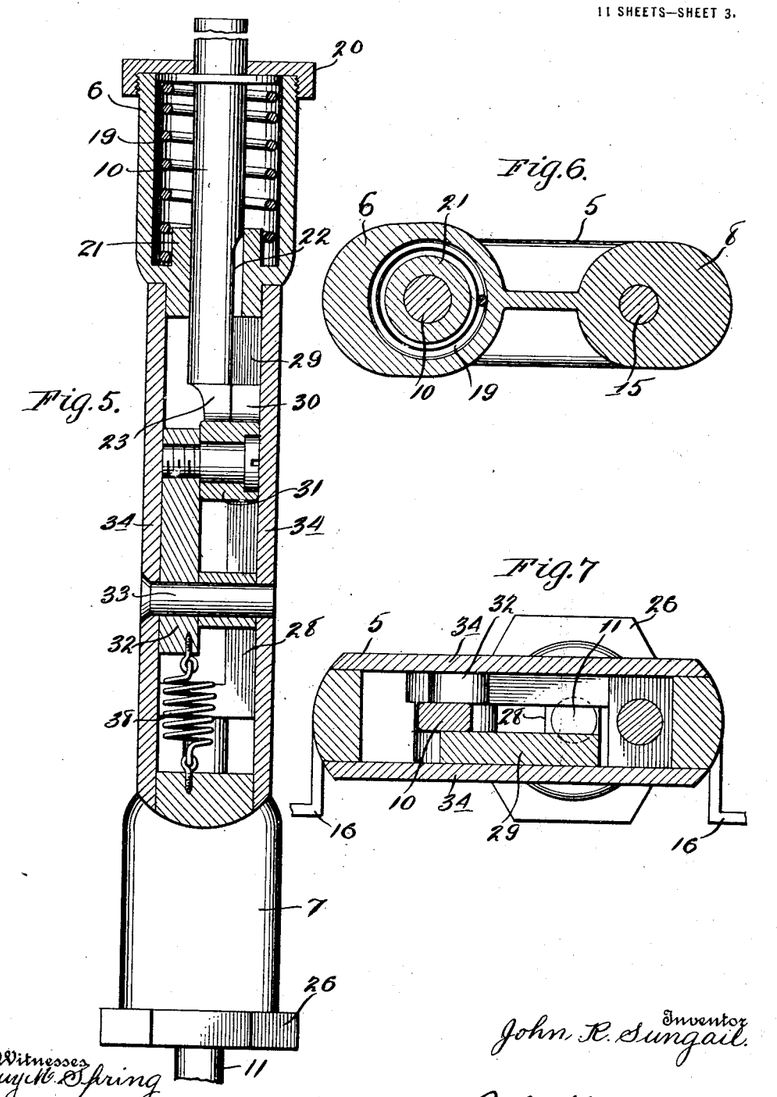
Fig. 5 is a sectional view taken on the line 5—5 of Fig. 4.
Fig. 6 is a similar view taken on the line 6—6 of Fig. 4.
Fig. 7 is a like view taken on the line 7—7 of Fig. 4, Figs. 8, 9, 10 and 11 are perspective details of separate elements of the casing mechanism enlarged.
Figure 8:
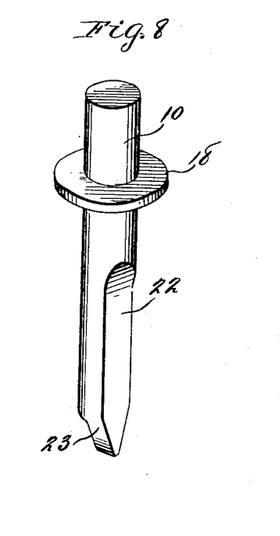
Figure 9:
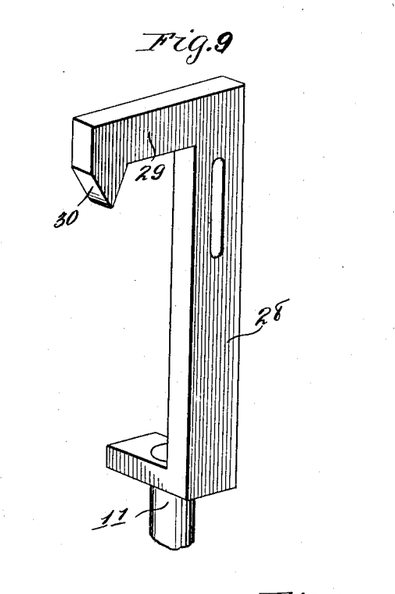
Figures 10, 11:
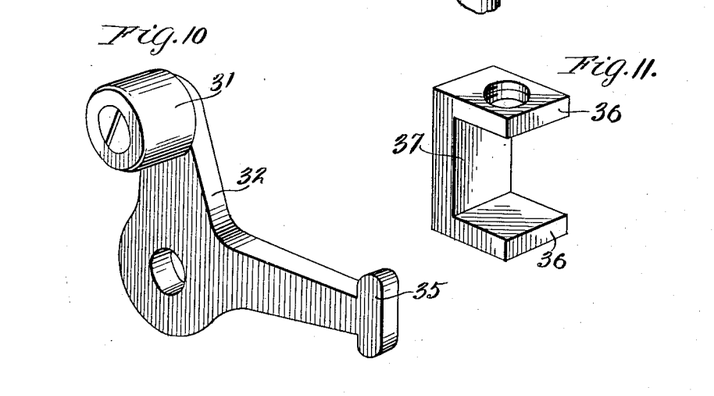

Referring now more particularly to Fig. 4, the cylindrical portion 6 is provided with a central vertical bore 17 of such size as to accommodate the collar 18 carried by the stem 10; and interposed between which latter and the bottom of the bore is the expansible resilient means 19 normally serving to hold the collar against the cap 20 which serves as a removable closure for the upper open end of this cylindrical portion 6. An upwardly projecting sleeve 21 rises from the bottom of the bore 17 and provides a firm bearing for the stem 10, which latter is laterally cut away as indicated at 22, for a purpose to be hereinafter more fully set forth, and which is beveled at its lower extremity as denoted by the numeral 23. Somewhat similarly mounted, the stem 11 is provided with a washer 24 affixed thereto and serving as a bearing point for the expansible resilient means 25 interposed therebetween and the removable closure 26 for the lower open end of this cylindrical portion, the internal bore of which is reduced at its upper extremity to provide a bearing for the stem 11, this stem projecting into an internal rectangular chamber 27 formed symmetrically within the casing 5. The stem 11 within the casing carries an L-shaped arm 28 provided at its upper extremity with a right-angled offset 29 on the end of which is a downwardly extending beveled portion 30 of the same size as the beveled extremity of the stem 10 with which latter it is placed in juxtaposition as clearly shown in Figs. 4 and 5, both of these beveled portions being designed to bear upon a spool 31 carried by a bell-crank lever 32. The beveled portions 23 and 30 of the two stems 10 and 11 are on opposite sides of a vertical line passing through the axes of the bell crank lever and the spool, so that any downward movement of one or the other stem will tilt the bell crank lever to right or left. As shown, the beveled portion 23 is on the left of said vertical line, while the portion 30 is on the right thereof. The bell crank lever 32 is disposed within the chamber 27 and is pivoted by the pin or rivet 33 extending transversely through the removable side walls 34 of the casing 5, these walls serving to cover the internal chamber 27. The free end of the lever 32 is enlarged to form a T-head 35 disposed between the extensions 36 of a U-shaped member 37 adapted to be carried on the lower threaded extremity of the rod 15 whereby direct connection is established to the meter. Resilient means such as the contractile helical spring 38 is connected to the bell-crank lever in alinement with the vertical spool carrying arm thereof and as will be readily apparent serves to maintain the lever in the neutral position illustrated. The extension arm 28 for the stem 11 is preferably slotted as at 39 in order to provide a working way for the pin 40 likewise transversely positioned in the side plates 34 as a means for maintaining the arm in a vertical path when reciprocating while a lug 41 apertured to slidably receive the stem 15 performs a similar office for this latter.

In operation, the entrance of a passenger into the car, to the steps of which one of these casings 5 is attached depresses first the step to which is connected the stem 11 and subsequently the step that actuates the stem 10 by the initial depression of the steps themselves which are yieldably held in the raised position illustrated in Fig. 1 by the action of the springs 25 and 19 as grouped about their respective stems. The depression first of the stem 11 causes the beveled portion 30 of the extension 29 and arm 28 to bear forcibly against the spool 31 carried by the lever 32 so that the former is forced through a counterclockwise arc of rotation which brings the upper portion of the T-head 35 in contact with the upper extension 36 of the U-shaped member and forces the stem 15 a short distance upward although not a sufficient distance to actuate the register or counting means to which the stem 15 is connected to register thereon the entrance of one person, which is only done upon a completion of the act of entrance including a depression of the upper car step and the consequent actuation of the stem 10 to engage the spool 31 and force it through a still larger arc of rotation about the pivot point 33 and in the similar counterclockwise direction. This is made possible from the fact that the first movement of the spool 31 was sufficient to carry its axis beyond the apex of the beveled portion 23 which, when pressed downward, acted on the spool at the right of a vertical line through its axis. The weight of the person having been withdrawn from each of the steps 1, the springs 19 and 25 return these latter to their normally raised position and the contractile spring 38 performs a similar office for the lever 32. It is to be understood that the exit of a person using the same steps will merely reverse the procedure and permit the beveled portions 23 and 30 of the stems 10 and 11 to engage the larger spool 31 and rotate it in a clockwise direction giving a movement of the rod 15 necessarily opposed to the first described movement.

It is to be understood, of course, that the registering device used in connection with a cased mechanism as described may be of the type shown in the patent granted to A. F. Nielsen, February 20, 1900, No. 643,883, and will register independently upon separate dials or counters the number of persons who have entered and left the car by means of the respectively opposed movements of the rod 15 in order that the difference between the totals thus displayed by the two dials or counters of the register will enable a person to immediately compute the number of passengers still remaining in the car, or such as is set forth in the patent granted to E. Priestman and F. Nell, Feb. 24, 1914, No. 1,088,622 which discloses a dial that is moved in one direction to register incoming passengers and in the opposite direction for subtracting the number of outgoing passengers.

Figure 12:
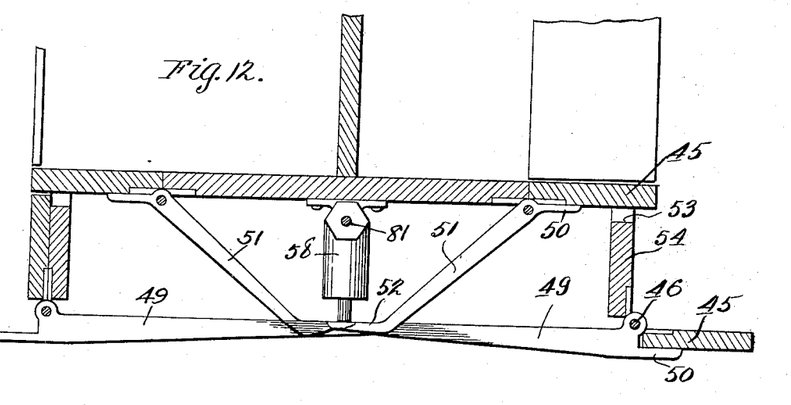
Fig. 12 is a transverse sectional view taken through a car platform and the steps therefor, illustrating the positioning of a casing of a differently arranged form attached to the car body instead of the steps.
Figure 13:
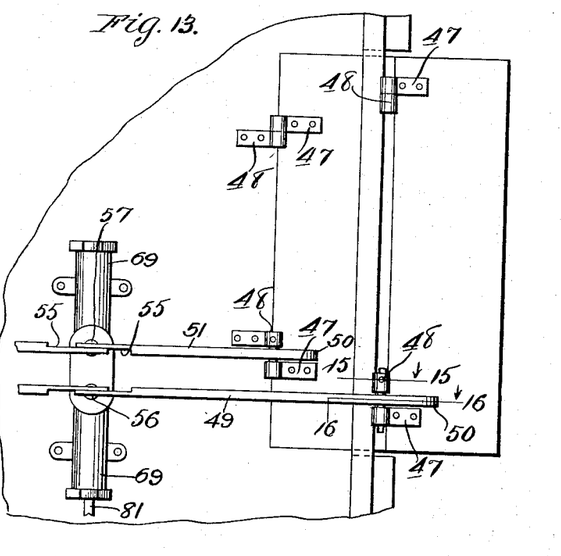
Fig. 13 is a bottom plan view of the matter shown in Fig. 12.
Figures 14, 15:
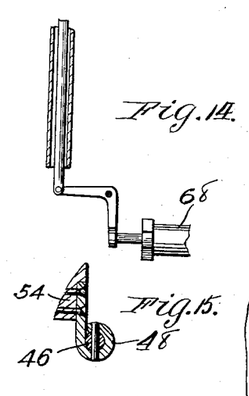
Fig. 14 is a detail of one form of connection of the casing to the register or counting device proper.
Fig. 15 is an enlarged detail section taken on the line 15—15 of Fig. 13.
Figure 16:
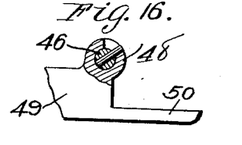
Fig. 16 is a similar view taken on the line 16—16 of Fig. 13.
Figure 17:
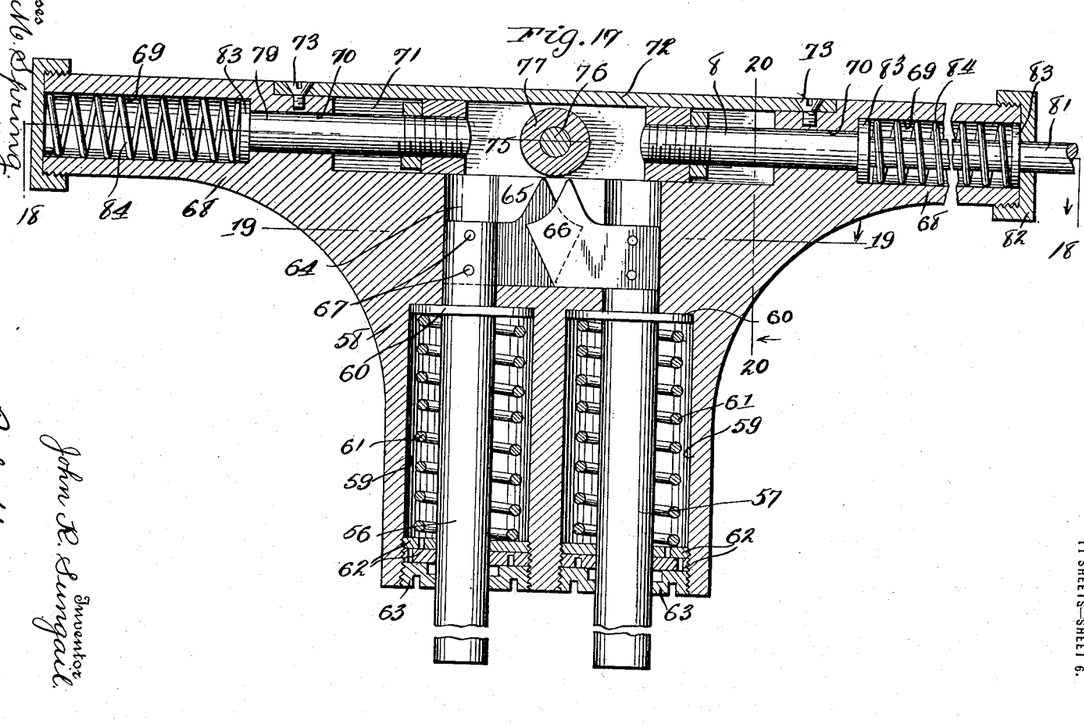
Fig. 17 is an enlarged longitudinal sectional view of the second form as illustrated in Fig. 12.
Figure 18:
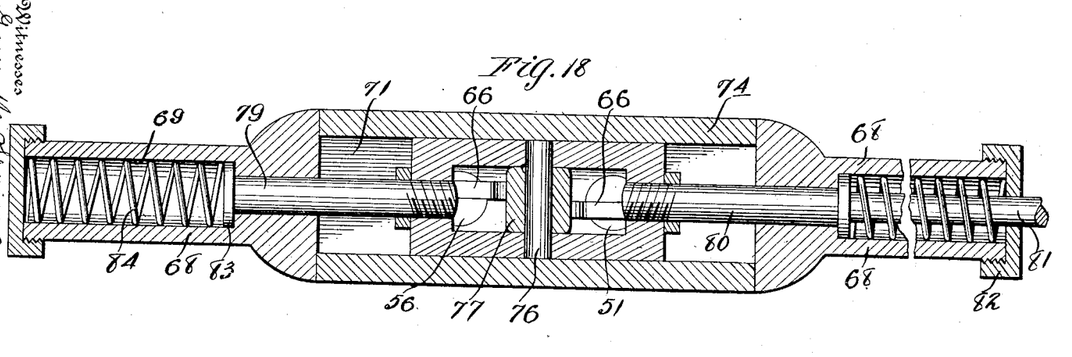
Fig. 18 is a sectional view taken on the line 18—18 of Fig. 17.
Figure 19:
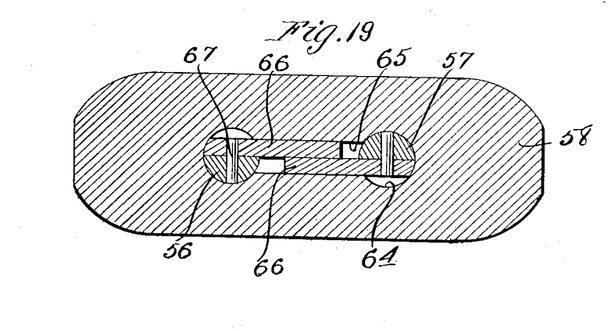
Fig. 19 is a similar view taken on the line 19—19 of Fig. 17.
Figure 20:
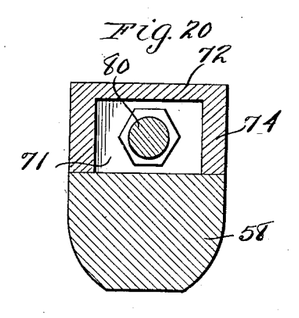
Fig. 20 is a like view taken on the line 20—20 of Fig. 17.
Figure 21:
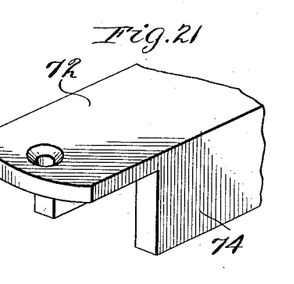
Figs. 21, 22 and 23 are enlarged detail perspectives of separate elements of the second form of mechanism.
Figures 22, 23:
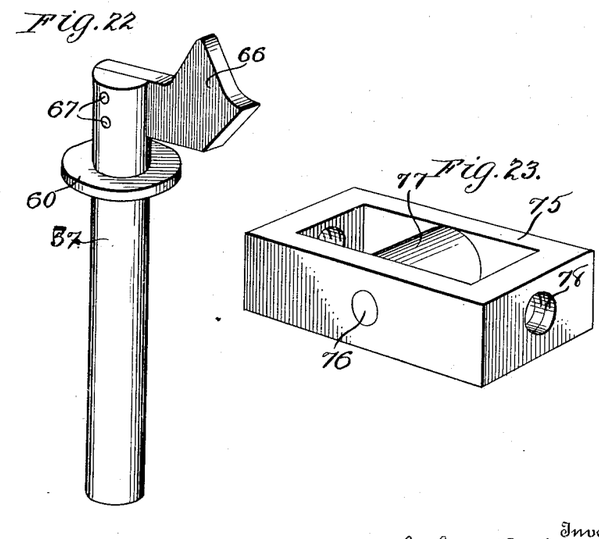

While the foregoing is to be construed as the detail description of one of the preferred forms of this invention, a modification thereof, or more exactly a second form is also comprehended herewith as is illustrated in Figs. 12 to 23 inclusive. In this second form, it is an aim to adapt this invention for use with one of the steps which are folded up in the well-known manner when the car is in motion and consequently are not provided with side walls 3 to which the casing could be attached. One of these cars is illustrated in Fig. 12 and includes the hinged steps 45, the lower one of which is adapted to be upwardly folded when not in use upon the hinge rods 46 upon which the hinge portions 47 and 48 are adapted to operate. Between these hinge portions of one pair of hinges for the lower step there is pivotally mounted upon the said rod an inwardly directed lever 49 having an outward extension 50 adapted to underlie the car step and to be depressed by the weight of a passenger on the latter to cause an upward movement of the inner end of the lever. Similarly placed between a pair of these hinged portions for the upper step there is a lever 51 also provided with an outwardly extending portion 50 adapted to underlie the step, said lever projecting inwardly and downwardly and bent adjacent its extremity in a horizontal plane as shown at 52, it being further noted that depression of this upper step is permitted by the cut out portion 53 formed along the upper edge of the riser 54. These bent ends 52 on levers 51 from opposite sides of the car, as well as the contracting ends of the lower levers 49 are cut away oppositely as indicated at 55 in order to permit both of the levers of each pair to contact with one or other of the stems 56 and 57 which are adapted to be respectively actuated as shown in Fig. 13 by the lower and upper step levers. Turning now to the specific description of this second form of mechanism as illustrated particularly in Figs. 17, 18 and 19, there will be noted a body portion 58 substantially oblong in cross section and provided with a pair of similar cylindrical bores 59 in which the stems 56 and 57 are respectively reciprocable. Dust rings or collars 60 are positioned about each of these stems and normally held in the upper limit of the bores 59 by the resilient means 61, the lower portions of these bores being closed by suitably threaded lock nuts 62 and a nut 63 of the variety shown. Continuous with the bores 59 and centrally alined therewith are the reduced bores 64 of such size as to form guides for the stems 56 and 57. These bores are connected by a transverse passageway 65 of sufficient size to receive the overlapping offset extensions 66, one of which is secured to each of the stems by any desirable means 67, the stems being flattened upon opposite sides for this purpose as illustrated in Fig. 19. The extensions 66 have each an upwardly projecting beveled portion, the two bores being spaced apart in a similar manner to the beveled portions 23—30 of the preferred form of the device and for a similar purpose. Cylindrical portions 68 are provided in horizontal alinement upon the body portion 58 and each contains a bore 69 which is reduced as at 70 to connect with an upper chamber 71 formed by the disposition of a cover 72 over that portion of the casing, such cover being removably secured by any suitable means 73 and being formed with the side walls 74 for the obvious purpose. A slidable carriage 75 is disposed within this chamber 71 being oblong in shape and transversely supporting the trunnion 76 of a spool 77 as illustrated to advantage in Fig. 23, the ends of this carriage having threaded apertures 78 to receive stems 79 and 80 slidable within the reduced bores 70. The stem 88 is formed with a reduced continuation 81 extending through the chamber 69 and the apertured closure cap 82. A washer 83 is loosely positioned upon this reduced stem 81 and serves as a bearing means for the expansible helical spring 84 which is interposed therebetween and a similar washer 83 at the opposite end of the bore. In the like bore 69 at the other end of the device, a corresponding washer 83 is supported in a like manner upon the reduced extremity of the stem 79 and is likewise borne against by a spring 84. This completes the description of details of this second form, the operation of which is as follows: A passenger in entering the car equipped with this particular form of the invention, steps successively upon the lower and upper steps 45 in that order and effects a depression of each, which movements are communicated to the stems 56 and 57 through the levers 49 and 51 and the respective rear extensions 50 thereof. The stem 56 being first actuated transforms the upward thrust thereof into a lateral thrust upon the carriage 75 by means of the spool 77 so that the carriage is forced to the right when positioned as in Fig. 17, far enough to carry the axis of the spool 77, or a perpendicular to the line of movement of the carriage through said axis, beyond the apex of the projection on the offset 66. The following thrust of the stem 57 continues the motion of the carriage in the same direction and concludes the operation of registering upon the meter the entrance of one person by means of the rod 81 which is connected to the mentioned meter as previously described in the case of the rod 15 of the first mentioned form. Upon the removal of the person's weight from the various steps the spring 84 acting upon the washer 83 bearing against the shoulder formed by the juncture of the reduced stem 81 with the stem 80 returns the carriage and consequently the vertical stems 56 and 57 to their original position. A reversal of these processes commencing with the primary actuation of the stem 57 is a result of a person leaving the car by these steps, the carriage 75 being forced to the left in this instance.

Figure 24:
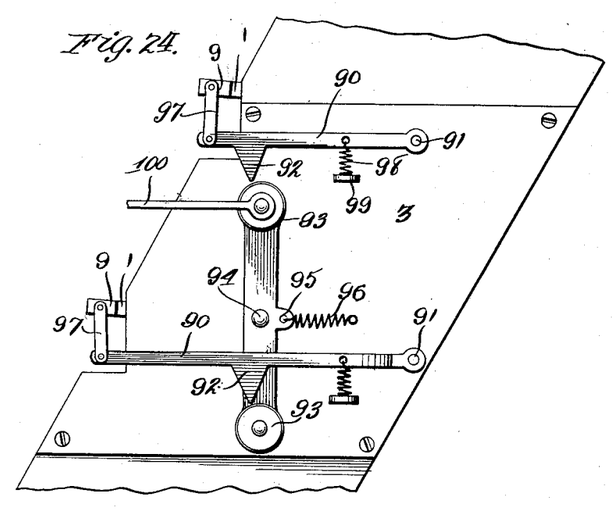
Fig. 24 is a view showing the steps of a car in elevation with a third form of mechanism positioned therewith.
Figure 25:
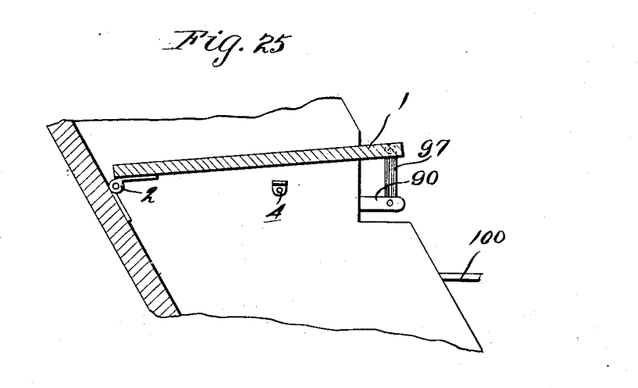
Fig. 25 is a sectional view taken through the car steps and looking in the opposite direction.

The third form illustrated in Figs. 24 and 25 is a logical adaptation of the form first described and like it is attachable to the side walls 3. In this last mentioned embodiment the casings are done away with and levers 90 are pivoted at one end as at 91, to the side walls and carry intermediate their ends beveled extensions 92 of a shape corresponding to the similar extensions formed upon the various stems described in the preceding forms and like them adapted to operate upon spools 93 respectively which are carried at the extremities of a bar lever centrally pivoted to the side walls 3 at the point denoted by the numeral 94 and formed with a rearwardly projecting ear 95 whereby the contractile spring 96 maintains the lever in its substantially vertical position. The steps 1 are formed with extensions 9 as in the first form and these latter are connected by the links 97 to the free ends of the levers 90. Expansible springs 98 rest upon suitable projections 99 from the step side walls 3 and serve to maintain the levers 90 and the steps 1 in their normal raised position. A stem 100 is pivotally connected to the upper spool 93 at one end and at the other is associated by any suitable connection with a meter or register of the character already described. In operation, it will be seen that this embodiment presents no essential differences from the two previously disclosed, the successive depression of the steps acting as in the former cases to give the bar lever the two impulses in one direction necessary to operate the meter.

Figure 26:
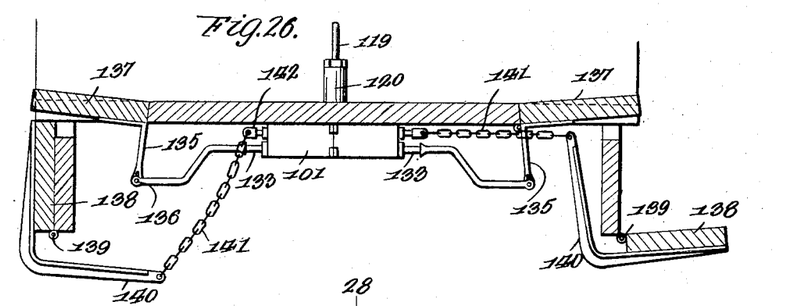
Fig. 26 is a view similar to Fig. 1, but showing the application of a fourth form of mechanism particularly fitted for use with foldable vehicle steps.
Figure 27:
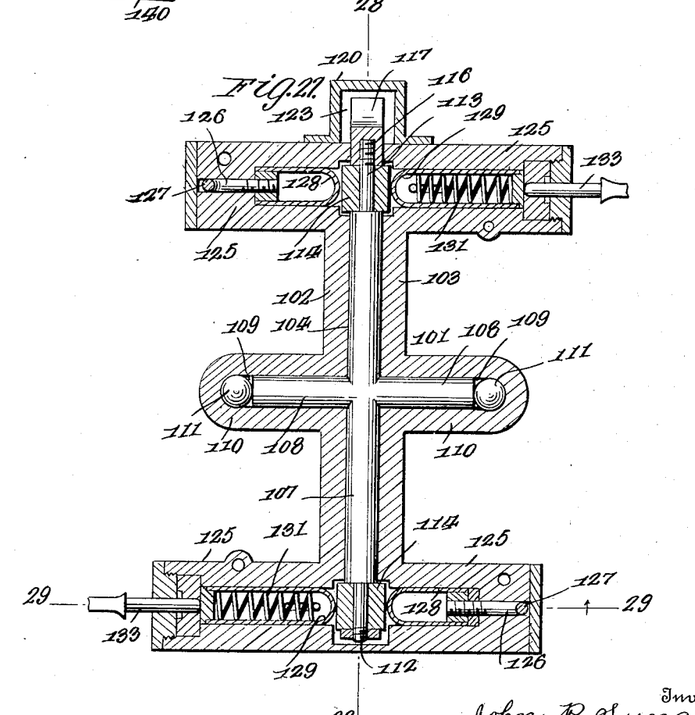
Fig. 27 is a sectional horizontal showing on an enlarged scale of the form disclosed in Fig. 26, and Figs. 28 and 29 are sectional views of the same matter as taken on the respective lines 28—28 and 29—29 of Fig. 27.
Figure 28:
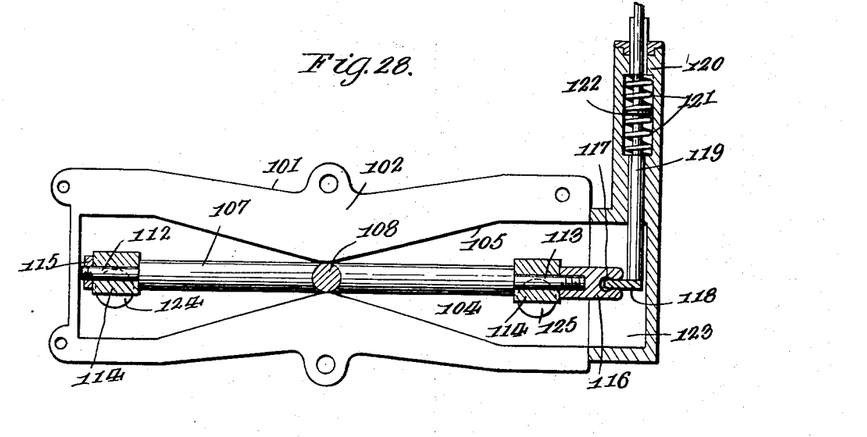

A fourth form is also contemplated by this invention which differs essentially from the previously disclosed form only by reason of having the cased mechanism horizontally positioned. Such an arrangement, illustrated in Fig. 26, is particularly applicable to that form of vehicle in which the lower steps are hingedly supported for the common raising or lowering movement, in the manner similar to that shown in Fig. 12. The present arrangement however, dispenses with the levers 50 and 51 by reason of the horizontal positioning of the casing 101. This casing is formed of two mating portions 102 and 103 which are oppositely disposed to each other to inclose a central chamber 104 formed by the meeting recesses 105 and 106, respectively formed in the meeting faces of the two portions. This central chamber is of the rectangular form in vertical cross section at its extremities illustrated in Fig. 29, but tapers from these extremities to the center in the doubly-conical manner shown in Fig. 28, in order to accommodate a lever 107 for a vertical and substantially pivotal movement of its extremities with respect to this center. Lateral trunnions 108 are formed on the lever at right angles thereto and at the center to be received in pockets 109 provided in the integral extensions 110 formed at the central portion of each section 102 and 103, suitable antifriction bearings 111 being also accommodated in the rounded extremities of these pockets to contact therebetween and the plane surfaced ends of the trunnions 108. Each extremity of the lever 107 is reduced and threaded in the manner indicated by the numerals 112 and 113, each of which receives thereupon a rotatable spool 114, that of the former being maintained by some such fastening means as the nut 115, while the latter is held in position by a plug 116 removably mounted upon the threaded extremity 113 in a similar manner to the nut but elongated and provided in its outer extremity with the pocket 117 forming a lost motion connection with an extension 118 carried at the end of a vertical rod 119 which is reciprocable within a suitable bore formed in the vertical tubular extension 120 and which is normally maintained in the position illustrated in Fig. 28 by means of the expansible springs 121, seated in an enlarged chamber communicating with said bore and surrounding said rod to act thereagainst through the medium of a washer 122 carried thereby and between said springs. The tubular extension 120 is enlarged adjacent the bottom and formed with a recess 123 in which the elongated plug 116 is adapted to work, such recess communicating directly with the chamber 104. Also communicating with this chamber but at right angles thereto, there is a pair of cylindrical bores 124 for each of the portions 102 and 103, one bore of each pair being transversely alined with one of the spools 114 and the bores of the first mentioned section being disposed a slight vertical distance below the horizontal diameter of such spools when the lever 107 is in its normal horizontal position and the bores of the other pair being oppositely disposed a slight vertical distance above this diameter, as will be clearly apparent from a perusal of Figs. 28 and 29. All of these bores are contained in suitable wing extensions 125 formed at the extremities of the respective portions 102 and 103 and at right angles thereto so that each of the sections may be said to be E-shaped in plan as placed back to back.

Figure 29:
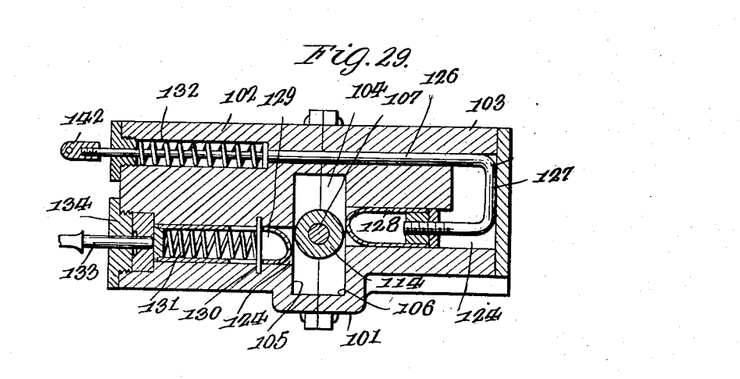

One bore 124 of each pair is L-shaped, reference being now had to the pair of bores illustrated in the sectional view of Fig. 29, the stem of the L, being directed upwardly to communicate with a horizontal channel extending over the chamber 104. In this channel is mounted a rod 126 twice bent at right angles upon itself and in the same direction as indicated at 127 to enter the horizontal portion of the L-bore and to connect therewith by means of its threaded extremity with a suitable plunger 128 which is reciprocable in that portion of the said bore and is designed to act upon the adjacent spool 114 of the rocking lever 107 in substantially the manner already set forth in connection with the other forms, as will be hereinafter more fully explained. A similar plunger 129 is mounted in the opposite bore of the other portion and is slotted to receive a pin 130 rigidly mounted across the bore to limit the movement of the plunger and to act as a base against which a spring 131 reacts in normally maintaining the plunger in the position illustrated. The bent portion of the rod 126 acts against the vertical walls of the L-shaped bore to similarly limit the movement of the plunger 128 while a spring 132 surrounds a reduced portion of this rod and serves the same purpose therefor as the spring 131 in the first described case. A stem 133 extends from the plunger 129 through suitable cap nuts 134 and is connected by a Z-shaped lever with a right-angled bracket 135 in the pin-and-slot manner denoted by the numeral 136, such bracket being fastened to the upper step 137 of the vehicle which is hinged to normally occupy a slightly raised position in which it is resiliently held by means of the mentioned spring 131. The lower step 138 is hinged at 139 to a stationary portion for its upward foldable movement and carries the L-shaped arm 140 in the manner illustrated, the free extremity of which arm is connected by a suitable chain or other fastening connection 141 to an apertured head 142 carried by the protruding extremity of the rod 126. It will thus be seen that the automatic registering mechanism for each step is carried in a pair of transversely alined wing portions 125 and that both pairs of steps are similarly connected to the mechanism and operate in exactly the same manner. For this reason, the operation of but one of these steps need be set forth. When the step is let down the chain 141 is tightened by the upward movement of the free extremity of the angle arm 140 and the lower step 138 therefor rests upon the spring 132. The entrance of a person into the vehicle, will of course, first depress this step so that the mentioned spring will be compressed in permitting the bent rod 126 to actuate the plunger 128 in driving the same into contact with its adjacent spool 114. The line of action of this plunger is somewhat off-centered with respect to the spool, so that the latter will give in the opposite direction downwardly for the extremity 112 of the lever 107 and upwardly for the opposite extremity until the spool has been depressed below the center line of the opposite plunger 129. This latter is connected to the upper step and the weight of the person depresses this in turn so that the spring 131 is compressed in allowing the plunger 129 to act upon the spool already moved and to displace it farther in the same direction, thus giving it the final movement necessary to actuate the counting mechanism to which the rod 119 is to be connected in any suitable manner as set forth with relation to the first described forms, in registering the entrance of the passenger. The exit of a person from the car will actuate the upper step and its connected plunger 129 primarily so that the spool opposite thereto will be moved upwardly thereby, in the case of the lever extremity 112 or downwardly in the case of the opposite end of such lever, while depression of the lower step in turn will in the same manner as above set forth continue the rocking movement of the lever in the same direction and, accordingly, oppositely actuate the counting rod 119. It will therefore be seen that the main distinction to be made between this form and the others is that the cased mechanism is horizontally disposed as previously stated, together with such minor details as legitimately fall within the scope of an invention of this character.

While in the foregoing however, there has thus been illustrated in the drawings, and described in the specification, such combination and arrangement of elements as constitute the preferred embodiments of this invention, it is desired to emphasize the fact that such minor changes in the matters of proportion and degree may be made in later adaptations of this device as shall not alter the spirit of the invention as defined in the appended claims.

What is claimed is:

1. Means for operating an indicator containing two independent registering devices, said means comprising a rocking lever movable in two directions from an intermediate normal position, means connected to said lever for operating one or the other of said registering devices depending on the direction of movement of said lever from the normal position, and a plurality of means successively operable on said lever to collectively impart thereto a movement of sufficient amplitude to operate a registering device of said indicator, the direction of movement of said lever being determined by the order in which said lever operating means are actuated.

2. The combination with a vehicle provided with steps giving entrance thereinto and egress therefrom, means adapted to be moved in two opposite directions from an intermediate normal position, means connected to the aforesaid means for operating either of two registering devices contained in the indicator on said vehicle and depending upon the direction of movement of said lever from the normal, and means on each step for successively operating on said lever when said step is depressed to collectively impart thereto a movement of sufficient amplitude to operate a registering device, the direction of movement of said lever being determined by the order in which said steps are depressed.

3. The combination with a vehicle provided with steps leading thereinto and giving egress therefrom, of a rocking means movable in opposite directions from a normally maintained intermediate position, means connected to said rocking means for transmitting the movement thereof to an indicator having two independent registering devices, and means on each step for successively operating on said lever when said steps are depressed to collectively impart thereto a movement of sufficient amplitude to operate either register, the direction of movement of said lever being determined by the order in which said steps are depressed.

4. The combination with a vehicle provided with depressible steps giving entrance into said vehicle and egress therefrom, of means movable in opposite directions from a normally maintained intermediate position to effect actuation of a registering device in either direction, and means independently actuated by each of said steps when depressed in succession to partially operate said movable means, the combined actuation serving to transmit a complete operating impulse in either direction to said movable means, the direction of movement being determined by the order in which said steps are depressed.

5. The combination with a vehicle having depressible steps arranged in pairs at each entrance or exit of the vehicle, a mechanism for operating a registering device in position to be actuated by said steps, said mechanism including a rocking lever movable in two directions from a normally maintained intermediate position, two stems each actuated by one step of a pair when depressed to rock said lever a limited distance, and a third stem operated by the combined and successive action of the first named stems to operate said registering device, the direction of movement of said rocking lever being governed by the order in which said steps are depressed.

6. The combination with a vehicle provided with depressible steps giving entrance thereinto or egress therefrom, a chambered casing, a lever pivoted within said casing, means connected to said steps for operating in succession on the extremities of said lever to give the lever a complete operative movement, and means loosely connected to one of said extremities and adapted to operate a registering device when given a complete movement in either direction, said movement being governed in direction by the order in which said steps are depressed.

7. The combination with a vehicle provided with steps giving entrance into said vehicle and egress therefrom, of means hinged to and resiliently supporting said steps in raised position, means rigidly supporting said steps in a depressed position, a rocking lever having a vertical and a horizontal arm adapted to be moved in two directions from a normally maintained intermediate position, a stem connecting one of said arms to a registering device for independently registering the two movements of said lever, means carried by the resiliently supporting means for said steps to successively actuate said rocking lever when said steps are depressed, the direction of operation of said lever being governed by the order of depression of said steps.

8. A device of the character described including a casing provided with an interior chamber and having oppositely disposed bores communicating with said chamber, a stem reciprocable in each of said bores and entering said chamber, a beveled end portion formed on each stem within the chamber, said beveled ends being spaced a short distance apart, a rocking elbow lever transversely positioned in said chamber and movable in two directions from a normal intermediate position, the longitudinal axis of one arm of said lever passing through its center of oscillation and between the beveled ends of said stems, and means for successively actuating said beveled ended stems to move said lever by their combined action in either direction to actuate the registering device in an indicator and governed in said direction of movement by the order in which said stems engage said lever.

9. A device of the character described including a chambered casing provided with oppositely disposed bores communicating therewith, a stem reciprocable in one of said bores, means resiliently maintaining said stem in a predetermined position, a beveled portion formed on said stem and projecting into said casing, a second stem reciprocable in the other of said bores, similar means to resiliently maintain said second stem in a predetermined position, an L-shaped arm carried by said second stem, an angular extension formed on said arm, a beveled portion formed on said extension in juxtaposition with the beveled portion of the first said stem, a lever rotatably mounted below said beveled portions, a spool carried by said lever in contact with said beveled portions, means resiliently maintaining said lever in a vertical position, and means whereby the depression of one of said stems may throw said lever out of the vertical in a direction determined by the particular stem and whereby movement of the other stem will rotate said lever still farther from the vertical in the same direction.

In testimony whereof I affix my signature in presence of two witnesses.

JOHN R. SUNGAIL.

Witnesses:
  LEWIS P. SIMPSON,
  RUDOLPH BRICKMAN.

Copies of this patent may be obtained for five cents each, by addressing the "Commissioner of Patents, Washington, D. C."